(12) United States Patent
McMahan et al.

(10) Patent No.: US 10,269,162 B2
(45) Date of Patent: Apr. 23, 2019

(54) SYSTEM AND METHOD FOR MODELING OBJECT MOVEMENT

(71) Applicant: Envisico LLC, Ann Arbor, MI (US)

(72) Inventors: Jeffrey Lee McMahan, Woodhaven, MI (US); Steven P. Owsinski, Grass Lake, MI (US); Kevin D. Sly, Ann Arbor, MI (US)

(73) Assignee: Envisico LLC, Ann Arbor, MI (US)

( * ) Notice: Subject to any disclaimer, the term of this patent is extended or adjusted under 35 U.S.C. 154(b) by 0 days.

(21) Appl. No.: 15/813,038

(22) Filed: Nov. 14, 2017

(65) Prior Publication Data

US 2018/0137664 A1    May 17, 2018

Related U.S. Application Data

(60) Provisional application No. 62/421,994, filed on Nov. 14, 2016.

(51) Int. Cl.
*G06T 11/60* (2006.01)
*G06F 3/0346* (2013.01)
*G06Q 30/06* (2012.01)

(52) U.S. Cl.
CPC ............ *G06T 11/60* (2013.01); *G06F 3/0346* (2013.01); *G06Q 30/0643* (2013.01)

(58) Field of Classification Search
CPC .... G06T 11/60; G06F 3/0346; G06Q 30/0643

USPC .................................................. 345/649–659
See application file for complete search history.

(56) References Cited

U.S. PATENT DOCUMENTS

| 2014/0104156 | A1* | 4/2014 | Touma ................... G06F 3/014 345/156 |
| 2017/0061679 | A1* | 3/2017 | Grimaud .............. G06K 9/4652 |
| 2018/0357702 | A1* | 12/2018 | Jain .................... G06Q 30/0631 |

* cited by examiner

*Primary Examiner* — Ryan R Yang
(74) *Attorney, Agent, or Firm* — Mitchell Law PLLC; Matthew W. Mitchell (57) ABSTRACT

A method and device for modeling and displaying a virtual jewelry object is disclosed. The method includes, receiving, by a device, a jewelry object, the jewelry object being defined as a set of components, each component being defined by component-type, size, shape, pixel info, orientation, and at least one constraint point, associating constraint points among components of the jewelry object, assessing processing capabilities of the device, monitoring gravity direction in relation to the device, monitoring tilt of the device using a gyroscope sensor and an accelerometer, calculating position and orientation of the components of the jewelry object based upon the monitored gravity direction, the monitored tilt, a friction constant, and the constraint points, and iteratively, displaying the components of the jewelry object at the calculated position and orientation.

21 Claims, 7 Drawing Sheets

SYSTEM AND METHOD FOR MODELING OBJECT MOVEMENT

CROSS REFERENCE TO RELATED APPLICATIONS

This application claims the benefit of Provisional Application No. 62/421,994 filed on Nov. 14, 2016 which is hereby incorporated herein by reference.

TECHNICAL FIELD

This disclosure relates to electronic modeling of objects, and more particularly to modeling jewelry objects based upon mobile device movement.

BACKGROUND

The statements in this section merely provide background information related to the present disclosure and may not constitute prior art.

It is known in the art to shop and view online web shopping, i.e., ecommerce web sites, for jewelry. Typically, jewelry articles are presented as pictures, representative of the item offered for sale. Users of the website can navigate among jewelry object's reading specifications associated with the item for sale and navigating among pictures associated with the item. For example, more than one angle of the item may be viewed. The pictures are static, limiting the viewer to angles and inclinations from which the pictures were taken. Hence, online shoppers are disadvantaged in that they are not able to get a true sense of the item.

What is needed are systems and methods for modeling jewelry object movement so that an online user may get a better sense of the object.

SUMMARY

Methods and systems are disclosed for modeling jewelry object movements.

A method and device for modeling and displaying a virtual jewelry object is disclosed. The method includes, receiving, by a device, a jewelry object, the jewelry object being defined as a set of components, each component being defined by component-type, size, shape, pixel info, orientation, and at least one constraint point, associating constraint points among components of the jewelry object, assessing processing capabilities of the device, monitoring gravity direction in relation to the device, monitoring tilt of the device using a gyroscope sensor and an accelerometer, calculating position and orientation of the components of the jewelry object based upon the monitored gravity direction, the monitored tilt, a friction constant, and the constraint points, and iteratively, displaying the components of the jewelry object at the calculated position and orientation.

Certain embodiments of the invention include a feature of modeling jewelry object movements within a browser based upon accelerometer and/or gyroscope sensor input.

Certain embodiments of the invention include assessing the processor capabilities of the device and modifying a quantity of calculated positions and orientations to be displayed per second based upon the assessed processor capabilities.

BRIEF DESCRIPTION OF THE DRAWINGS

One or more embodiments will now be described, by way of example, with reference to the accompanying drawings, in which.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. As used herein, the term "or" may be construed in either an inclusive or exclusive sense. Similarly, the term "exemplary" used throughout this description means "serving as an example, instance, or illustration," and should not necessarily be construed as preferred or advantageous over other exemplary aspects.

According to some embodiments, a graphical user interface (GUI) element is provided to display various objects such as jewelry objects. In one embodiment, the objects or jewelry object is displayed as part of a content viewing application such as a browser application. Throughout this application, a browser application is utilized as an example of a content viewing application; however, other types of content viewing applications can also be applied. According to one embodiment, in response to a user input, the jewelry object is displayed as a sidebar window or an accessory window, for example, associated with or within the same instance of a browser application in which a main window is being displayed.

According to one embodiment, a user can add a photograph of themselves or another by actuating, e.g., by clicking, a predetermined button and then navigating to or selecting a picture from a list or display. In this way, a user may select a jewelry object to be superimposed over the photograph for display to a user.

Figure 1:
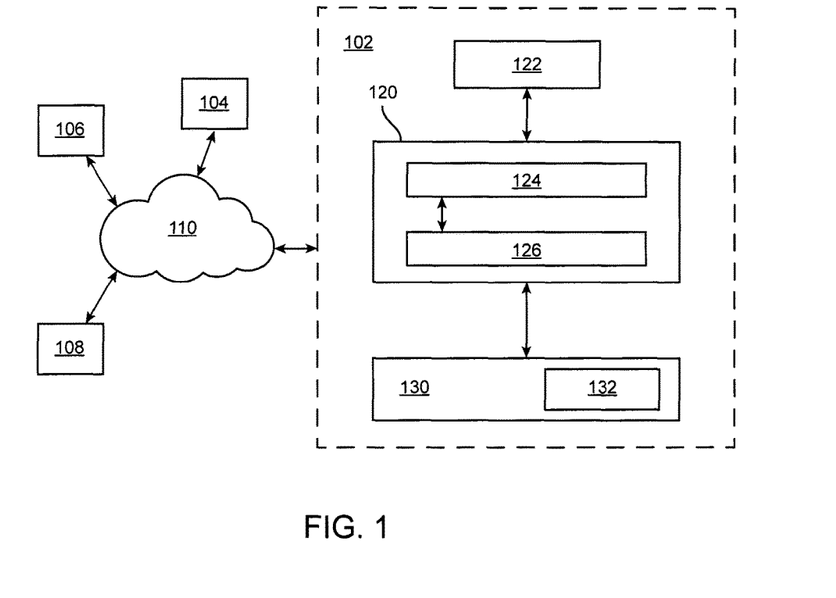
FIG. 1 is a block diagram illustrating a system for modeling object movement, in accordance with the present disclosure.

FIG. 1 is a block diagram illustrating a system 100 for modeling objects according to one embodiment of the invention. Referring to FIG. 1, the system 100 includes a mobile device 102 communicatively coupled to other devices such as a server 104, a computing device 106, and a content/service provider 108 over a network 110. The network 110 can be a local area network (LAN), a wide area network (WAN), or a combination of both. The device 102 and 106 may be most any kind of computing devices, such as, for example, a desktop computer, a laptop computer, a tablet, a mobile phone, a media device, etc. In one embodiment, the device 102 includes, but is not limited to, a browser application 120 executed in a memory by a processor of the device 102 to retrieve a content page such as a Web page from a remote web site or from a remote or local file system, and to present the content page in a graphical user interface ("GUI") using a display device 122.

In one embodiment, the browser application 120 includes content presentation module 124 and content retrieval or processing module 126. The content retrieval module 126 is configured to retrieve a presentation page such as a web page from a content provider such as a web site 108 and the content presentation module 124 is configured to present or display the presentation page on the display device 122. Throughout this disclosure, a web page is utilized as an example of a presentation page and a web server is utilized as an example of a content provider. Other types of content and servers may also be applied. In one embodiment, when the content retrieval module 126 receives a web page, it parses the web page and objects, and the content presentation module 124 is configured to render the web page based upon the parsing and to display the web page on the display device 122.

According to one embodiment, information (e.g., images, physical attributes, e.g., height, width, weight, etc., and simulation attributes, e.g., connecting points, hole positions, etc.)) of the jewelry objects can be maintained in a system memory of a data processing system in which the corresponding browser application is running. Alternatively, the information 132 of the jewelry objects can also be stored in a persistent storage location such as a storage device 130, such that the information can be populated and displayed when browser application 120 is launched.

Figure 2:
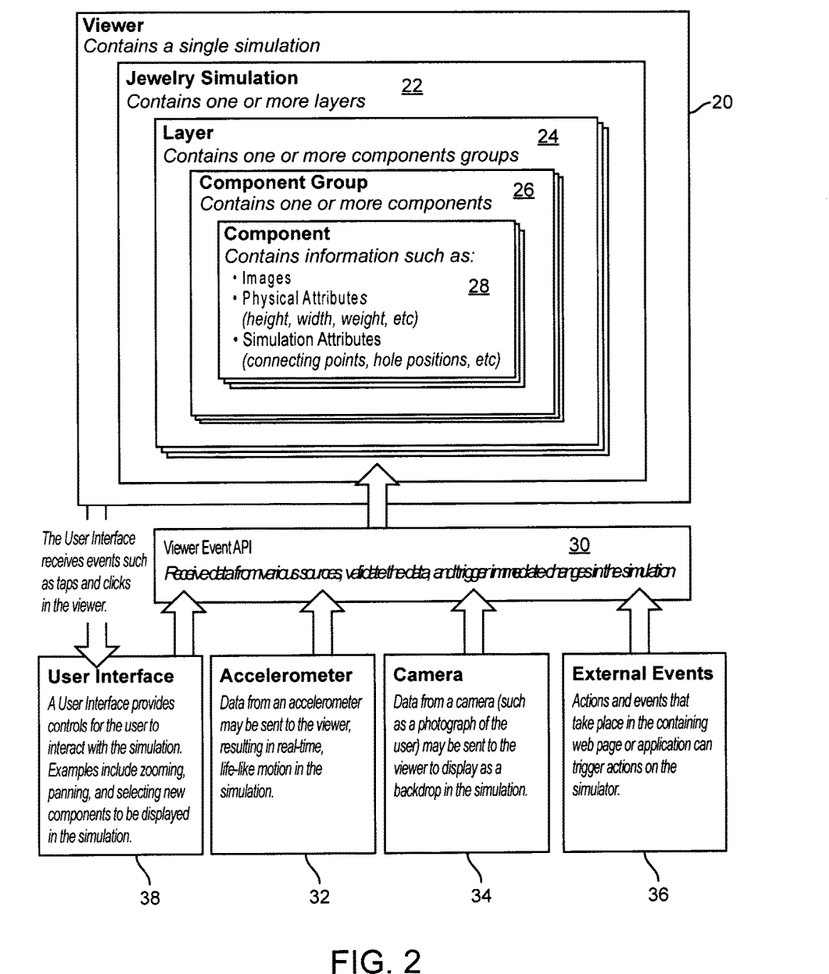
FIG. 2 schematically shows an exemplary configuration of information flow and component arrangement of a system for displaying modeled objects within a browser, in accordance with the present disclosure.

FIG. 2 schematically shows an exemplary configuration of information flow and component arrangement of a system for displaying modeled objects within a browser. As FIG. 2 shows, an exemplary viewer 20 is included for displaying modeled objects within the browser 120. Each viewer 20 includes a jewelry simulation module 22. Each jewelry simulation module 22 includes one or more layers 24. Each layer includes one or more component groups 26. Each component group contains one or more components 28. Each component 28 may be defined according to: (1) a pre-defined image or array of pixel-based data; (2) physical attributes, e.g., height, width, weight, etc.; and (3) simulation attributes, e.g., connecting points, hole positions, etc.

In one embodiment, a viewer event API 30 is communicatively connected to the viewer 20. The API 30 is configured to receive data from various sources, validate the data, and execute changes in the simulation based upon the received and validated data. In one embodiment, accelerometer data 32 is sent to the API 30. In one embodiment, camera information 34 is sent to the API 30. In one embodiment, external events information 36 is sent to the API.

External events can include actuation of control-based function, e.g., stop, web page navigation, etc. In one embodiment, a user interface 38 is configured to provide control for the user to interact with the simulation. For example, the user interface 38 may be configured to selectively zoom, pan, and/or select new components for display. The user interface 38 may be configured to accept user actuation information from tactile inputs, mouse-based inputs, or keyboard inputs for control.

Figure 3:
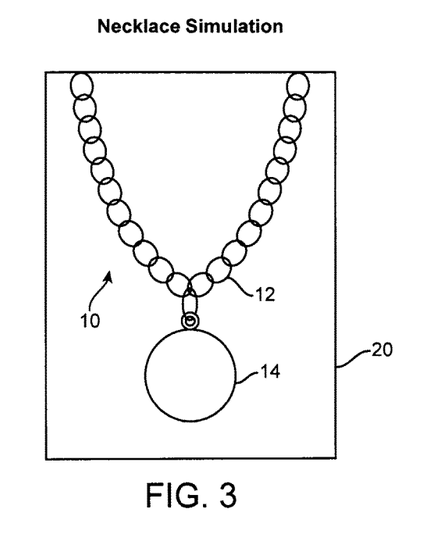
FIG. 3 is an exemplary illustration of a viewer having an exemplary jewelry object having a plurality of components and a pendant, in accordance with the present disclosure.

FIG. 3 is an exemplary illustration of a viewer 20 having an exemplary jewelry object 10 having a plurality of components 12 and a pendant 14. The pendant 14 may be classified and processed as a component 12 consistent with the teachings herein. As FIG. 3 shows, the components 12 are chain linked, having an internal constraint of attachment to one or more components.

Figure 4A:
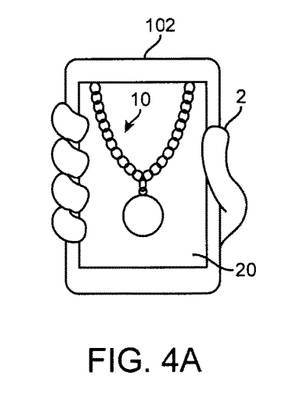
FIGS. 4A-4C illustrates exemplary modeling of the jewelry object within an exemplary viewer on the mobile device, in accordance with the present disclosure.
Figure 4B:
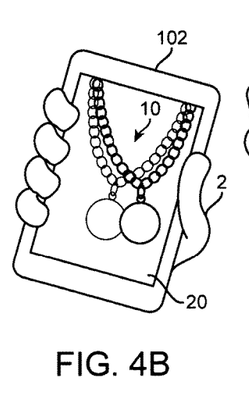
Figure 4C:
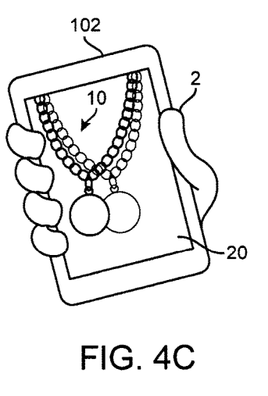

FIGS. 4A-4C illustrates exemplary modeling of the jewelry object 10 within an exemplary viewer 20 on the mobile device 102. As FIGS. 4A-4C show, movement of the mobile device 120 by a user 2 affects positioning of the jewelry object 10. As described herein below, motion of the mobile device 102 is monitored from one or more sensors, which are then used to model position and orientation of the components of the jewelry object 10.

In various embodiments executed in a workstation of desktop computer environment, the effects of device tilt and gravity may be presupposed or inputted based upon cursor movement from a mouse, keyboard inputs, head-tracking inputs, or other sensors and/or input devices configured to measure movements or supply information.

Figure 5:
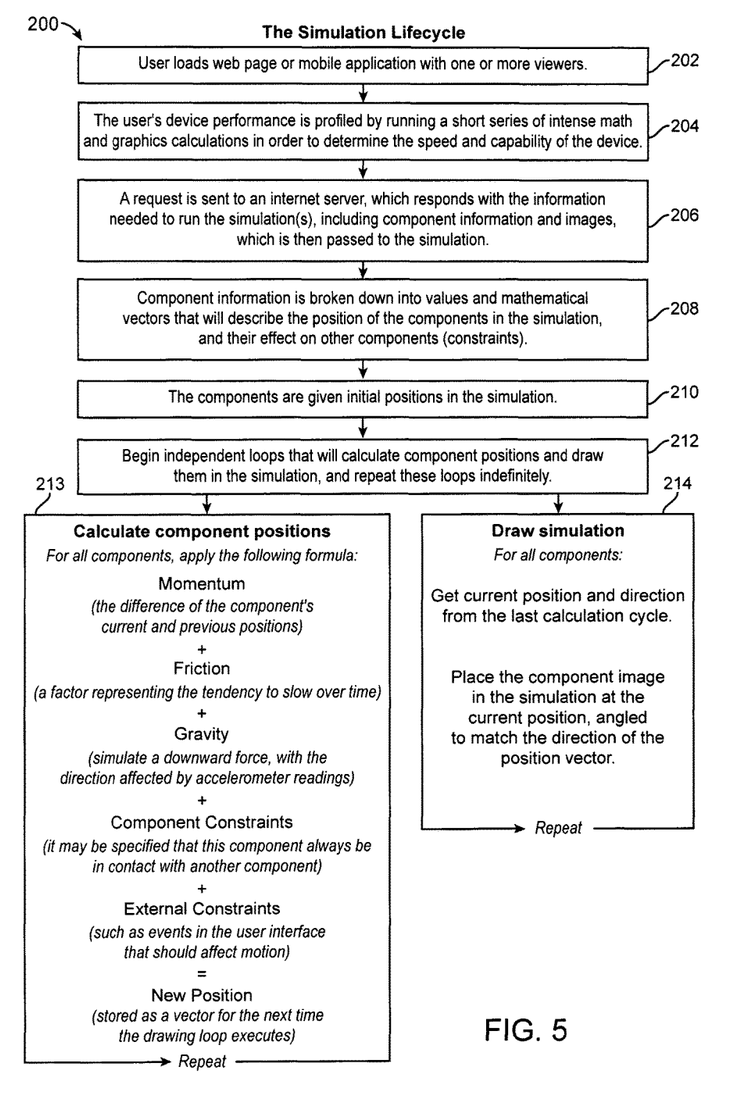
FIG. 5 is a flow diagram illustrating an example of a technique for modeling objects based upon motion feedback of a mobile device, in accordance with the present disclosure.

FIG. 5 is a flow diagram illustrating an example of a technique 200 for modeling objects based upon motion feedback of a mobile device 102. The technique 200 may be performed by the mobile device 102, or, more specifically, by an application program executing on the mobile device 102 such as the browser 120 in conjunction with hardware components that detect changes in the physical orientation of mobile device 102 and send signals to that application program. Although certain operations are described as being performed in a certain order in technique 200, alternative embodiments of the invention can involve similar techniques being performed with fewer, additional, or different operations, and/or with those operations being performed in a different order.

In block 202, the technique 200 is initiated via launch of the browser 120 to a URL location associated with a Web page having at least one viewer module. In block 204, processing capabilities of the mobile device 102 are assessed. Processing capabilities may be assessed by obtaining identification information associated with one or more hardware components, e.g., the central processing unit, amount of RAM, and/or GPU. These hardware components may be pre-profiled and associated with a pre-determined processing capability metric or score. In one embodiment, processing capabilities are assessed by executing a series of intense math and/or graphics calculations. In this way, the speed and capability of the device 102 may be assessed given its current configuration, memory and hardware commitments, etc. In one embodiment, drawing frame rates may be set based upon the assessed processing capabilities or determined profile.

In block 206, in response to a request by the user, the mobile device 120 transmits a request to the provider 108 for information associated with a modeling of a jewelry object, i.e., information associated with simulation of a jewelry object. The information may include component information and images, in one embodiment. In block 208, component information is received for position, constraints, and mathematical vectors that represent, in part, position, constraints, and vectors for connected or associated components. In one embodiment, the server 104 transmits the information needed to run the simulations in the form of a layer specification 24, which may be a structured data type.

In block 210, initial values are given to the component information. In one embodiment, an initial position is given to each component. In one embodiment, an initial association is given to each component. In one embodiment, an initial connection point is defined for one or more components. In one embodiment, a constraint is defined for one or more components.

In block 212, a component position loop 213 and a drawing loop 214 are initiated. The component position loop 213 calculates a position associated with a component, while the drawing loop 214 draws the components based upon the initial position or the calculated positions. In one embodiment, loops 213 and 214 are executed concurrently. In one embodiment, loops 213 and 214 are executed consecutively, i.e., serially. In one embodiment, loops 213 and 214 are executed independently, in parallel, such as via a multiple core processor.

The component position loop 213 determines position for each component based upon: (1) momentum; (2) friction; (3) gravity; (4) component constraints; and (5) external constraints. Momentum is determined based upon a difference between a selected component's current position and a previous position. Friction is a pre-defined value representing a tendency for a component to slow over time. Gravity is a simulated downward force, the downward direction being defined based upon sensor input, such as one or both of the accelerometer and gyroscope. Component constraints are defined based upon arrangement and connectedness of components to other components. For example, a chain link-shaped component may be constrained when 'linked' with another component. External constraints may be pre-defined events, e.g., a vibration sequence, settling sequence, input from a user input device, e.g., mouse, and/or gravity force application. In one embodiment, the position is determined as a vector, e.g., position and trajectory.

In various embodiments, external constraints may be selectively applied by the user. For example, components types may be transferred out, i.e., switch or exchanged. In one embodiment, a user may select from a plurality of jewelry objects, such as necklaces, bracelets, chains, etc. In one embodiment, a user may select from a plurality of component types. It is contemplated herein that the teachings of this disclosure may be readily applied to various jewelry pieces and components of jewelry pieces and is not limited thereby except for the limitations within the appended claims.

In one exemplary operation, when a model is being displayed in a web page on a viewing device such as a mobile phone 102, the modeling may capture a tap from the user interface of the device or other selective device actuation. Using X and Y coordinates of the tap (or actuation), and the current calculated position of components in the simulation, the simulation detects if the tap was inside a component being simulated. If the tap was inside a component, and the Layer Specification 24 allows for that component to be replaced with other possible components, then a set of choices may be displayed to the user. The user may then select a new component, which is sent to the simulation via the Viewer API in diagram The Viewer 20. The simulation responds immediately by swapping in the new component for the old one, updating its calculations and redrawing the new object.

In one embodiment, optimization techniques may be applied to more efficiently calculate positions of the components. In this way, battery power may be saved and jerky or slow animation avoided. To that end, it is contemplated that the inverse of Hooke's Law may be applied to positioning of the constrain points. Hooke's law states that the amount of force needed to compress or stretch a spring by a certain distance is proportional to that distance, i.e., Force is equal to a constant factor characteristic of the spring (stiffness) multiplied by a distance variable that accounts for a total possible deformation of that spring.

In one embodiment, when the simulation is calculating the initial positions of components, it may encounter items that are not connected, but have rigid constraints specifying that they must be connected. As the modeling pulls these items together, it has a chain reaction on other items that also need to stay connected. Applying Hooke's law to the disconnected items (in order to connect them) would imply that the farther away two items are from each other, the larger the force would need to be to bring them together. Applying a large force in the modeling would cause other large forces to be applied to the other components that need to remain connected. Multiple large forces being applied on different components in a chain reaction like this results in chaotic, jerky motion before the components finally arrive at their expected position in the jewelry object. This also results in more calculations and slower, less life-like motion. To reduce this effect, and achieve life-like motion with fewer calculations, the modeling applies forces that are inverse to Hooke's law. Instead of larger forces being applied to components as they separate, smaller forces are applied (becoming larger as they the components get closer). The resulting motion is smoother, and the jewelry object arrives at a settled, life-like representation with fewer and faster calculations.

In various embodiments, object "chunking" may be applied to more effectively model jewelry object motion. For example, in some simulated jewelry objects, such as a length of chain, individual components can be "chunked" and treated as a single, aggregate component. The simulation will determine if a set of components may be chunked, stipulating that the chunking will not affect the natural, life-like motion of the object. The simulation may treat those chunked objects as a single object, reducing the number of constraints needed to calculate positioning of that aggregate object. This allows calculations to happen faster, and performance will be more life-life and less draining on the viewing device. Object "chunking" may be applied based upon the mobile device's profile or determined processing capabilities.

The drawing loop 214 receives the vector positioning information from the component position loop 213. In one embodiment, components are drawn in the viewer based upon: (1) the received vector positioning information; (2) predefined library-based information associated with the component; and (3) a current position of the component. In one embodiment, the component is drawn in the viewer at a new position at an angle indicated by the vector using pixel-based information contained within the predefined library associated with the component type.

Figure 6:
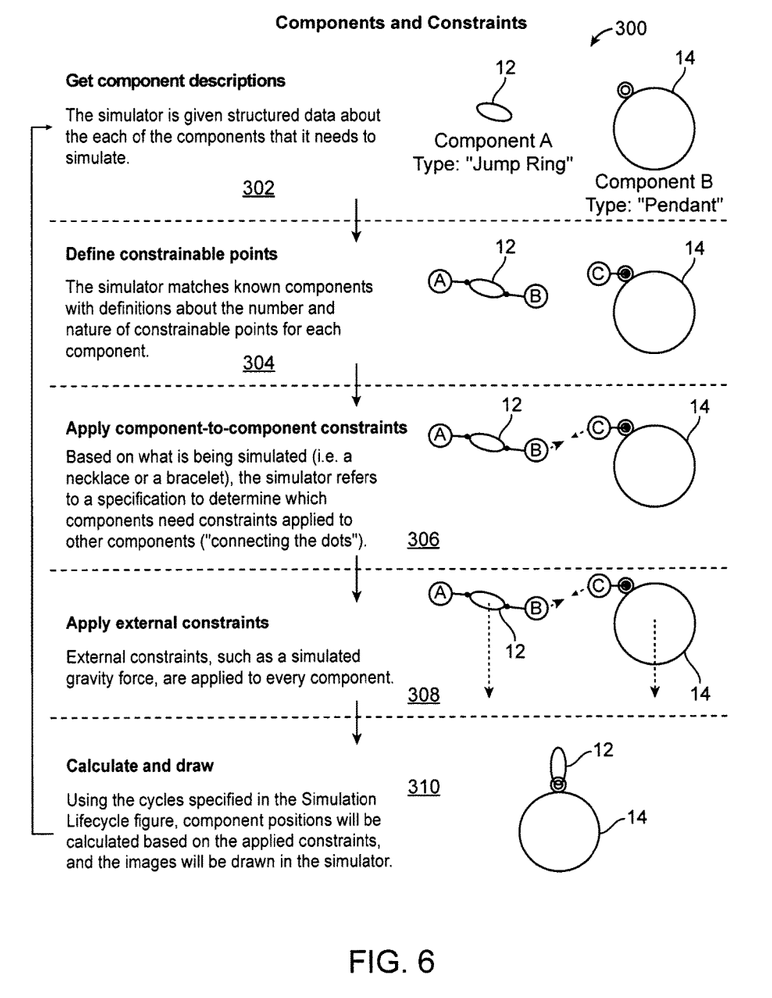
FIG. 6 is a flow diagram illustrating an example of a technique for modeling objects based upon motion feedback of a mobile device, in accordance with the present disclosure.

FIG. 6 is a flow diagram illustrating an example of a technique 300 for modeling objects based upon motion feedback of a mobile device 102. The technique 300 may be performed by the mobile device 102, or, more specifically, by an application program executing on the mobile device 102 such as the browser 120 in conjunction with hardware components that detect changes in the physical orientation of mobile device 102 and send signals to that application program. Although certain operations are described as being performed in a certain order in technique 300, alternative embodiments of the invention can involve similar techniques being performed with fewer, additional, or different operations, and/or with those operations being performed in a different order.

As FIG. 6 shows, the technique 300 may be initiated at step 302 where a mobile device 102 receives a data structure file, e.g., a web-based file, having information about a jewelry object to be simulated. In one embodiment, the data structure file has information associated with one or more components and component types.

At step 304, the technique may include defining constrainable points. Known components, i.e., components listed in the data structure file, may be definable by constrainable points. In one embodiment, each component has at least one constrainable point. In one embodiment, the points may be defined on a two-dimensional grid according to pixel location.

At step 306, the technique applies a component-to-component constraint to at least one component of the jewelry object. Constraints may be defined as linked positioning, i.e., at a first component-to-component location constraint B associated with component 12 is associated with constraint C of component 14. In one embodiment, the constraint point is a pre-defined pixel distance from the component-to-component location. In this way, the visual image generated appears to overlap components.

At step 308, the technique 300 applies any applicable external constraints. For example, a simulated gravity force or settling sequence may be applied to the jewelry object 10. At step 310, the technique 300 may apply positioning calculations of the components such as determined using the component position loop 213 described hereinabove and may draw the components by executing a drawing loop such as drawing loop 214 described hereinabove.

Figure 7:
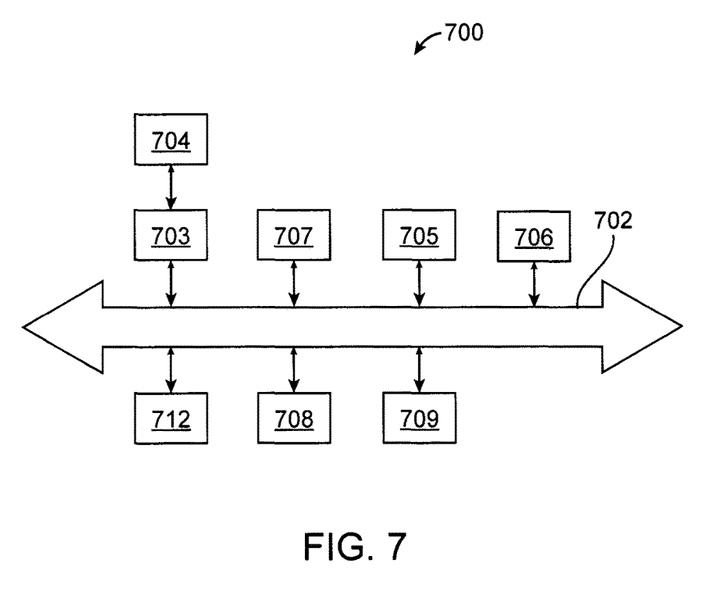
FIG. 7 is a block diagram of a device, in accordance with the present disclosure.

FIG. 7 is a block diagram of a device 700, which may be used with one embodiment of the invention. For example, the device 700 may be used as part of any of devices or systems 102, 104, 106, and 108 as shown in FIG. 1. Note that while FIG. 7 illustrates various components of a computer system, it is not intended to represent any particular architecture or manner of interconnecting the components; as such details are not germane to the present invention. It will also be appreciated that network computers, handheld computers, tablets, cell phones and other mobile devices which have fewer components or perhaps more components may also be used with the present invention.

As shown in FIG. 7, the device 700, includes a bus or interconnect 702 which is coupled to one or more microprocessors 703 and a ROM 707, a volatile RAM 705, and a non-volatile memory 706. The microprocessor 703 is coupled to cache memory 704. The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art.

Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. In embodiments, the device 700 may include user input features or such as, but not limited to, a microphone, touch screen or pad, sensors 712, e.g., a gyroscope, a magnetometer, and an accelerometer.

Figure 8:
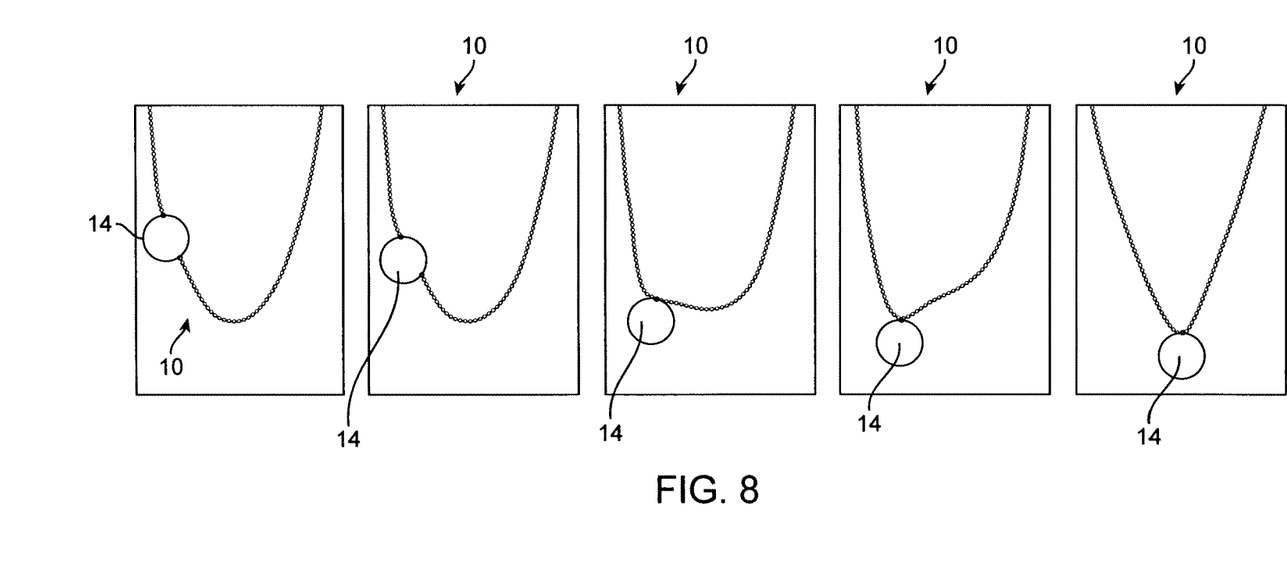
FIG. 8 shows an exemplary sequence of modeled jewelry objects, in accordance with the present disclosure.

FIG. 8 shows an exemplary sequence of modeled jewelry objects 10. As FIG. 8 shows, the sequence begins with a charm 12 dropping from a first position and ends with the charm resting on the jewelry object at a resting position. In one embodiment, the charm 12 includes additional constraints that are associated with components of the chain. These additional constraints are adjusted along the chain as the charm 12 falls, inhibiting movement of the charm outside of the additional constraints. In one embodiment, the additional constraints are adjusted along the chain in a predefined sequence. In this way, to the viewer, it the charm 12 appears to slide along the chain.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method for modeling and displaying a virtual jewelry object, the method comprising:
   receiving, by a device, a jewelry object, the jewelry object being defined as a set of components, each component being defined by component-type, size, shape, pixel info, orientation, and at least one constraint point;
   associating constraint points among components of the jewelry object;
   assessing processing capabilities of the device;
   monitoring gravity direction in relation to the device;
   monitoring tilt of the device using a gyroscope sensor and an accelerometer;
   calculating position and orientation of the components of the jewelry object based upon the monitored gravity direction, the monitored tilt, a friction constant, and the constraint points; and
   iteratively, displaying the components of the jewelry object at the calculated position and orientation.

2. The method of claim 1, wherein the position and orientation of the components is calculated, in part, based upon an inverse of Hooke's Law.

3. The method of claim 2, wherein the constraint point is a linked position of a first component to a second component.

4. The method of claim 2, wherein the constraint point is a pixel location a predefined distance from a component to component linked position.

5. The method of claim 2, wherein the inverse of Hooke's law is applied iteratively until contributing a value under a predefined threshold.

6. The method of claim 2, further comprising: further calculating the position and orientation of the components based upon momentum.

7. The method of claim 6, further comprising: further calculating the position and orientation of the components based upon an elapsed time, which is a function of the iteration duration.

8. The method of claim 2, wherein the calculating the position and the orientation of the components of the jewelry object is executed at a lower quantity per second when the assessing processing capabilities of the device are less than a predefined metric and executed at a higher quantity per second when the assessing processing capabilities of the device are greater than a second predefined metric.

9. The method of claim 8, wherein the assessing processing capabilities of the device are executed based upon an elapsed time a series of graphic calculations is executed by the device.

10. The mobile device of claim 8, wherein the assess processing capabilities of the device are executed based upon an elapsed time a series of graphic calculations is executed by the device.

11. The method of claim 2, further comprising:
   associating at least one component with an additional constraint to inhibit movement of the at least one component outside of the additional constraint; and
   adjusting the additional constraint in a predefined sequence.

12. A mobile device comprising:
   an accelerometer and gyroscope to detect an extent to which the mobile device is tilted relative to a direction of gravity;
   a gyroscope to detect an extent to which the mobile device is tilted unrelated to the direction of gravity; and
   processing circuitry comprising one or more processors and memory storing instructions,
   wherein execution of the instructions by the processing circuitry causes the apparatus to:
      receive, by a device, a jewelry object, the jewelry object being defined as a set of components, each component being defined by component-type, size, shape, pixel info, orientation, and at least one constraint point;
      associate constraint points among components of the jewelry object;
      assess processing capabilities of the device;
      monitor gravity direction in relation to the device;
      monitor tilt of the device;
      calculate position and orientation of the components of the jewelry object based upon the monitored gravity direction, the monitored tilt, a friction constant, and the constraint points; and
      iteratively, display the components of the jewelry object at the calculated position and orientation.

13. The mobile device of claim 12, wherein the position and orientation of the components is calculated, in part, based upon an inverse of Hooke's Law.

14. The mobile device of claim 13, wherein the constraint point is a linked position of a first component to a second component.

15. The mobile device of claim 13, wherein the constraint point is a pixel location a predefined distance from a component to component linked position.

16. The mobile device of claim 13, wherein the inverse of Hooke's law is applied iteratively until contributing a value under a predefined threshold.

17. The mobile device of claim 13, wherein the calculated position and orientation of the components is further calculated based upon momentum.

18. The mobile device of claim 17, wherein the calculated position and orientation of the components is further calculated based upon an elapsed time, which is a function of the iteration duration.

19. The mobile device of claim 13, wherein the calculate the position and the orientation of the components of the jewelry object is executed at a lower quantity per second when the assessing processing capabilities of the device are less than a predefined metric and executed at a higher quantity per second when the assessing processing capabilities of the device are greater than a second predefined metric.

20. A mobile device comprising:
an accelerometer and gyroscope to detect an extent to which the mobile device is tilted relative to a direction of gravity;
a gyroscope to detect an extent to which the mobile device is tilted unrelated to the direction of gravity; and
processing circuitry comprising one or more processors and memory storing instructions,
wherein execution of the instructions by the processing circuitry causes the apparatus to:
receive, by a device, a jewelry object, the jewelry object being defined as a set of components, each component being defined by component-type, size, shape, pixel info, orientation, and at least one constraint point;
associate constraint points among components of the jewelry object;
assess processing capabilities of the device;
monitor gravity direction in relation to the device;
monitor tilt of the device;
iteratively calculate position and orientation of the components of the jewelry object using an inverse of Hooke's law having a force variable, wherein the force variable is calculated based upon the monitored gravity direction, the monitored tilt, a friction constant for each of the constraint points; and
iteratively, display the components of the jewelry object at the calculated position and orientation.

21. The mobile device of claim 20, wherein the calculate the position and the orientation of the components of the jewelry object is executed at a lower quantity per second when the assessing processing capabilities of the device are less than a predefined metric and executed at a higher quantity per second when the assessing processing capabilities of the device are greater than a second predefined metric.

* * * * *